(12) United States Patent
Horton, Jr. et al.

(10) Patent No.: US 9,103,179 B2
(45) Date of Patent: *Aug. 11, 2015

(54) DIESEL RECOVERY SYSTEM AND METHOD

(71) Applicant: Environmental Recovery Solutions & Rental, LLC, Coalgate, OK (US)

(72) Inventors: Charles Horton, Jr., Coalgate, OK (US); Larry O Williams, Bokoshe, OK (US)

(73) Assignee: Environmental Recovery Solutions and Rental, LLC., Coalgate, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,995

(22) Filed: Oct. 21, 2014

(65) Prior Publication Data

US 2015/0034547 A1    Feb. 5, 2015

Related U.S. Application Data

(62) Division of application No. 13/527,269, filed on Jun. 19, 2012, now Pat. No. 8,894,320.

(60) Provisional application No. 61/502,097, filed on Jun. 28, 2011.

(51) Int. Cl.
  *B07B 1/30*  (2006.01)
  *E21B 21/06* (2006.01)
  *B01D 35/20* (2006.01)

(52) U.S. Cl.
  CPC .............. *E21B 21/065* (2013.01); *B01D 35/20* (2013.01)

(58) Field of Classification Search
  USPC .......................................... 209/342
  IPC ............................ B07B 1/30,1/40; E01B 27/05
  See application file for complete search history.

(56) References Cited

U.S. PATENT DOCUMENTS

| 35,594 | A |   | 6/1862 | Ensign |
|---|---|---|---|---|
| 692,145 | A | * | 1/1902 | Kerr ............................. 209/345 |
| 872,640 | A | * | 12/1907 | Bolger ......................... 209/342 |
| 971,018 | A | * | 9/1910 | Bolger ......................... 209/342 |
| 2,261,771 | A | * | 11/1941 | Laubenstein ................ 209/393 |
| 4,217,208 | A |   | 8/1980 | Wentzler |
| 5,392,925 | A |   | 2/1995 | Seyffert |
| 5,685,982 | A |   | 11/1997 | Foster |
| 5,863,430 | A |   | 1/1999 | Williams |
| 5,913,372 | A |   | 6/1999 | Dietzen |
| 5,996,387 | A |   | 12/1999 | Williams |
| 6,155,428 | A |   | 12/2000 | Bailey |
| 6,769,550 | B2 | * | 8/2004 | Burnett et al. ............... 209/399 |
| 6,863,183 | B2 |   | 3/2005 | Schulte |
| 7,059,805 | B1 |   | 6/2006 | Addison, Sr. |
| 7,581,647 | B2 |   | 9/2009 | Gricher |
| 8,894,320 | B1 | * | 11/2014 | Horton et al. .................. 404/72 |
| 1973/3766997 |   |   | 10/1973 | Heilhecker |
| 1990/4911834 |   |   | 3/1990 | Murphy |
| 1993/5199997 |   |   | 4/1993 | Stowe |
| 2001/6322489 |   |   | 11/2001 | Richardson |

(Continued)

*Primary Examiner* — Gary Hartmann
(74) *Attorney, Agent, or Firm* — McAfee & Taft

(57) ABSTRACT

The apparatus and method provide for the removal of well fluids from well cuttings and a method of disposal thereof. A vibratory separator mechanically shakes the well fluids from the cuttings into a first compartment and the well cuttings fall into a second compartment. Once the well cuttings are dried, cement kiln dust (CKD) is added to neutralize any remaining well fluids on the well cuttings. The neutralized well cuttings are applied to the roadbed of a gravel or dirt road.

9 Claims, 5 Drawing Sheets

(56) References Cited

U.S. PATENT DOCUMENTS

| | | |
|---|---|---|
| 2003/0116887 A1 | 6/2003 | Scott |
| 2004/6706108 | 3/2004 | Polston |
| 2006/7144516 | 12/2006 | Smith |
| 2008/0087472 A1 | 4/2008 | Fout |
| 2010/0193249 A1 | 8/2010 | Saiz |
| 2012/8287441 | 10/2012 | Rod Wick |
| 2013/8556083 | 10/2013 | Burnett |

* cited by examiner

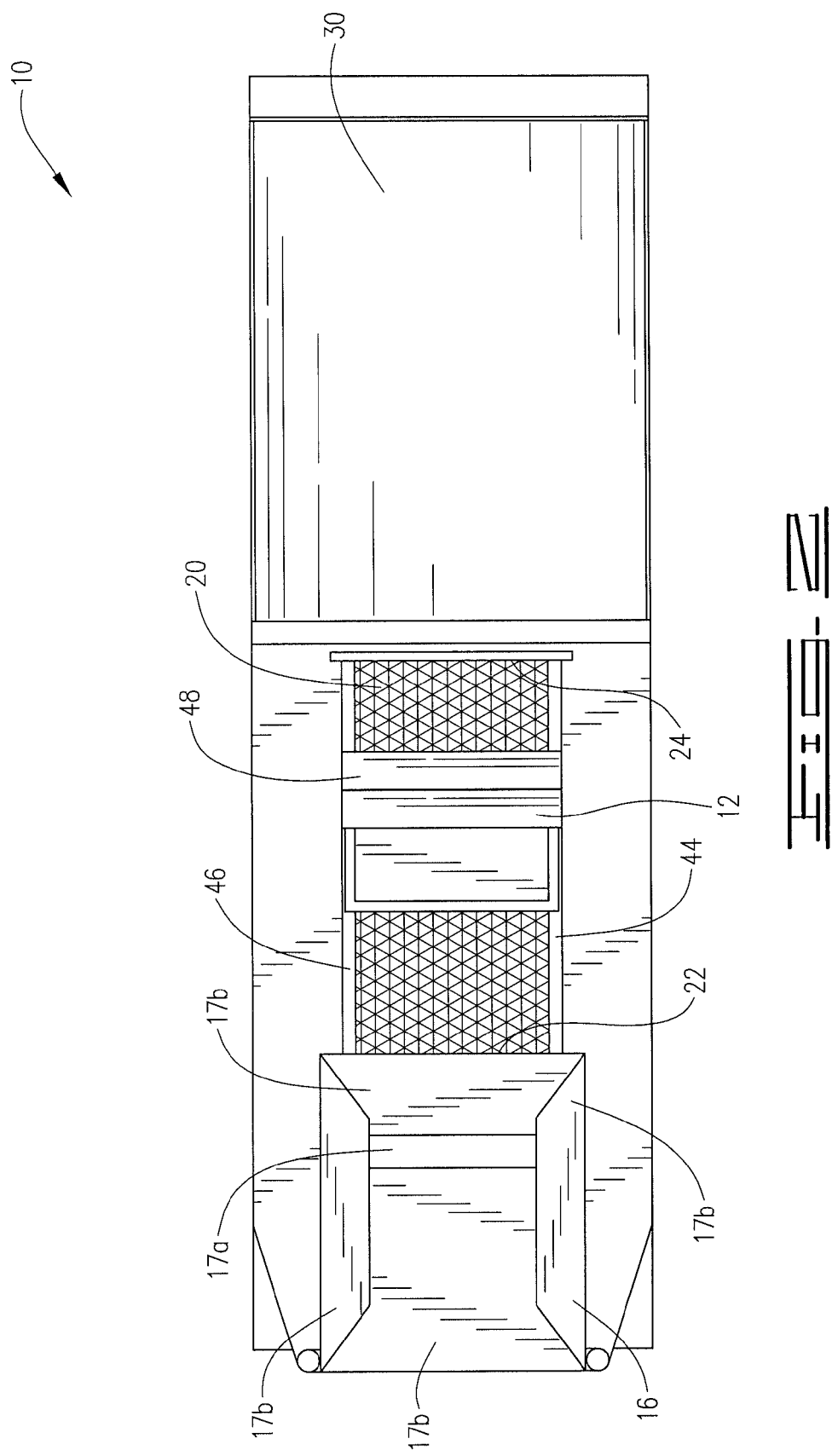

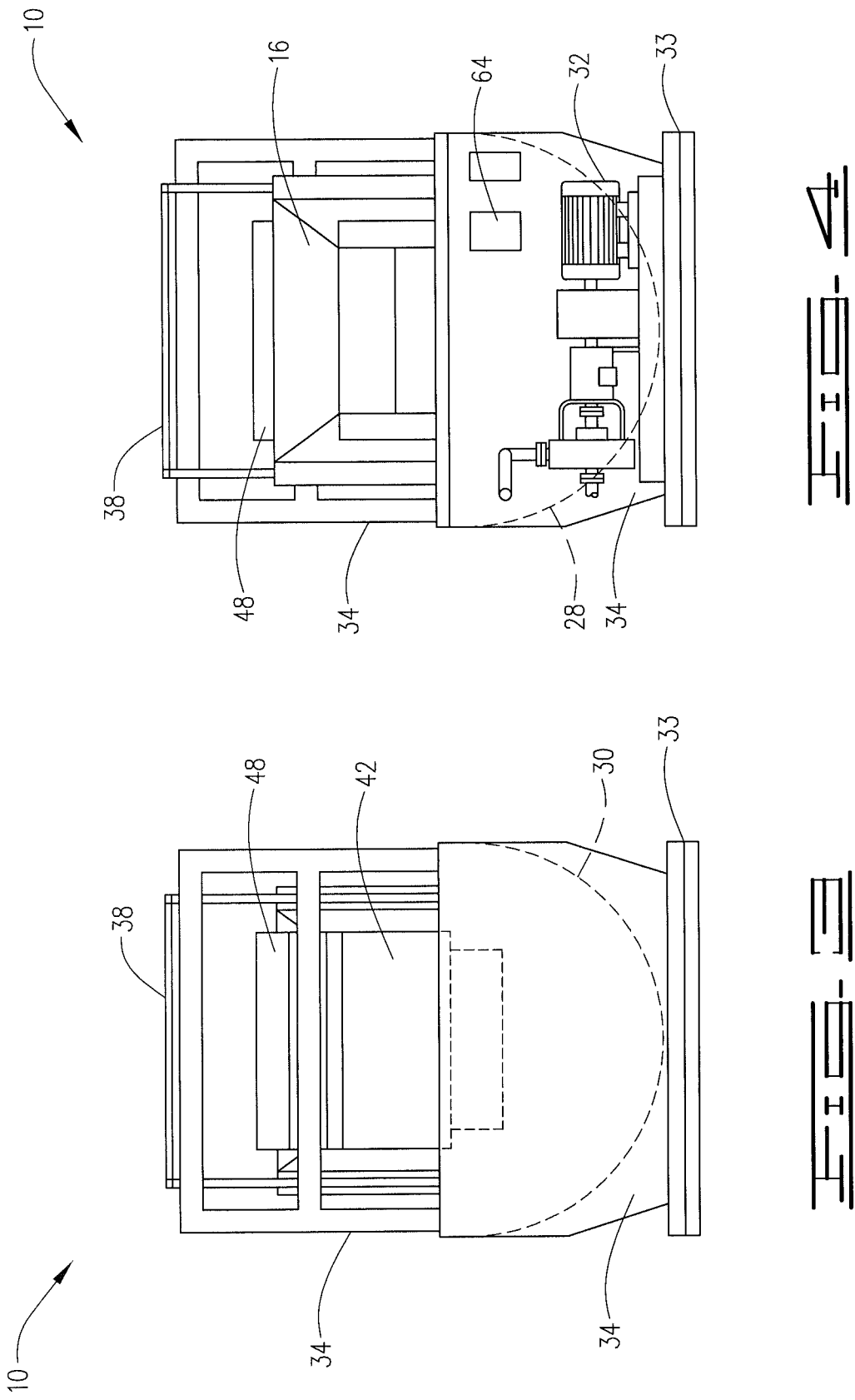

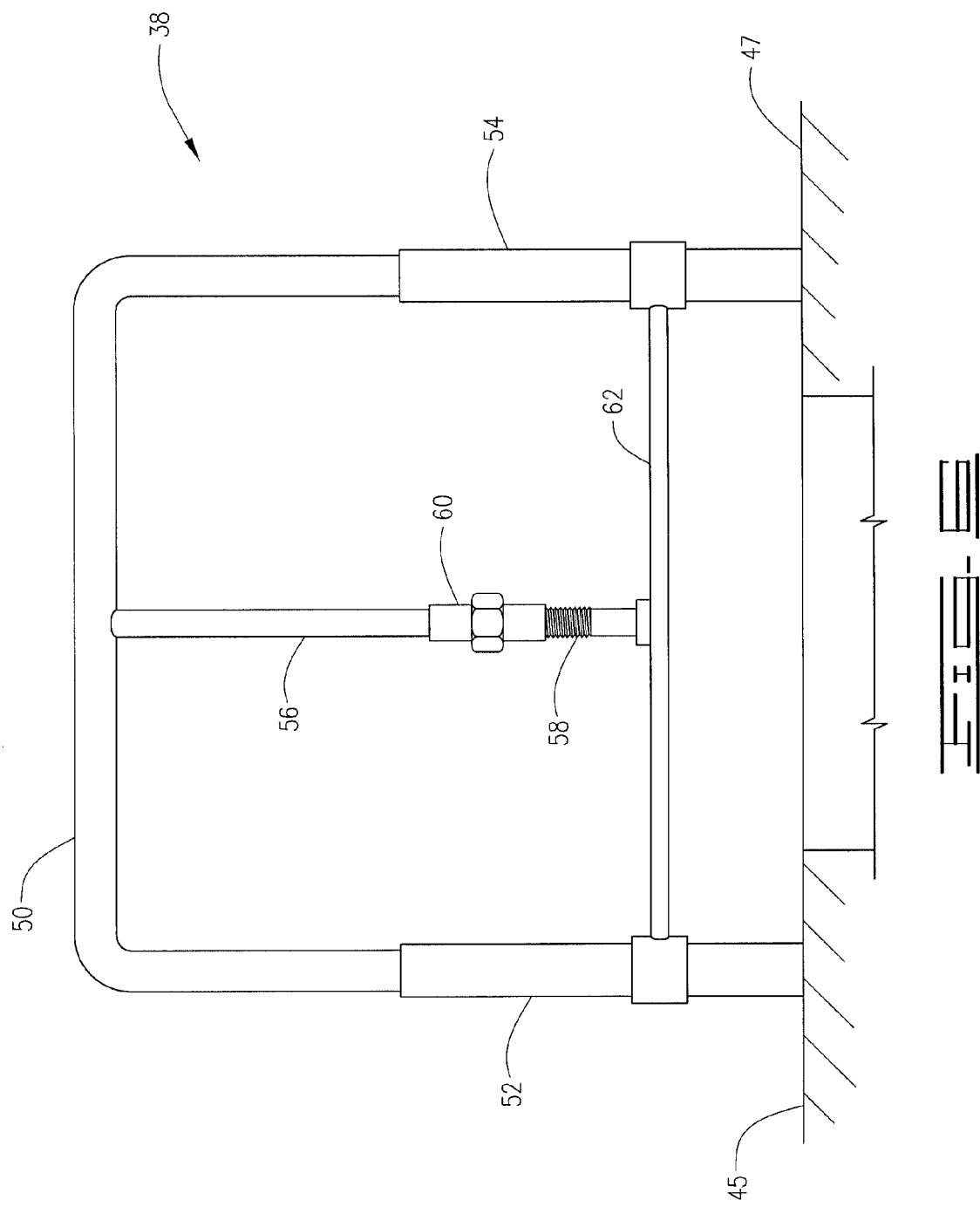

DIESEL RECOVERY SYSTEM AND METHOD

CROSS-REFERENCE TO RELATED APPLICATIONS

This application is a divisional of U.S. patent application Ser. No. 13/527,269 filed Jun. 19, 2012, now U.S. Pat. No. 8,894,320, and claims the benefit of U.S. Provisional Application No. 61/502,097 filed Jun. 28, 2011, both of which are incorporated by reference.

BACKGROUND

Oil and gas well operations produce cuttings during the process of drilling the well. These cuttings create three major challenges for the industry: oil and diesel recovery from the cuttings, neutralization of the cuttings, and disposal of the neutralized cuttings. Cuttings are typically mixed in with drilling mud, which comprise predominately hydrocarbons, oil, and other chemicals. The hydrocarbons and/or oil are sometimes referred to as diesel. Much of the drilling mud is recoverable if it can be separated from the cuttings. The cuttings must be neutralized and properly disposed of during and after drilling operations.

The first challenge is to separate the cuttings from the chemicals and hydrocarbons, such as diesel. As the cuttings are produced from the well bore, the cuttings are contained within the drilling mud. Currently, each well drilling operation loses hundreds of barrels of diesel every day. One problem is the inefficiency and capacity of the existing diesel recovery systems. These systems are unable to substantially separate the diesel from the cuttings. Often, these systems include storing the cuttings in pits and tanks, and then waiting for the diesel to float to the top. Other oil and gas producers use an expensive and time-consuming cyclonic means to separate the diesel from the cuttings. These recovery systems are unable to substantially separate the diesel from the cuttings.

Once the diesel is separated from the cuttings, the remaining cuttings still have residual traces of diesel. Thus, another challenge for the oil and gas producers is to neutralize the remaining chemicals and hydrocarbons left on the cuttings for environmentally safe disposal. Many producers use very expensive neutralizing agents. Some times, more than one type of neutralizing agent is required. Depending upon how much residual diesel remains on the cuttings, several units of the neutralizing agent may be required. A unit is the measure of the neutralizing agent ordered. Some units cost $1,600-$4,000 each. To neutralize the cuttings other techniques use potash or other similar type neutralizing agents. Thus, the overall expense to neutralize the cuttings can be exorbitantly expensive. In addition, after the cuttings are neutralized, they must be disposed of in an environmentally acceptable manner. Right now, the drilling operators pay to dispose of the neutralized cuttings.

SUMMARY

In accordance with the present invention, an apparatus and method for separating well fluids from well cuttings are provided which overcome the deficiencies described above, and have other advantages as well.

In one embodiment, the current invention provides an apparatus for separating a material containing well cuttings and well fluids. The apparatus comprises a hopper, a vibratory separator, a fluids receptacle, a cuttings receptacle and a slide. The hopper receives the material and directs it to a grate of the vibratory separator. The vibratory separator has a first end, a second end, a grate extending from the first end to the second end and a vibrator apparatus connected to the grate to vibrate the grate. The hopper is in communication with the first end so that material is directed from the hopper to the grate at the first end. The material is vibrated on the grate such that at least a portion of the well fluids is separated from the well cutting so that the well fluids passes through the grate and so that the well cuttings remain on the grate and move to the second end. The fluids receptacle is located beneath the vibratory separator such that well fluids passing through the grate are deposited in the fluids receptacle. The cuttings receptacle is located adjacent to the second end of the vibratory separator such the well cuttings are deposited into the cuttings receptacle. The slide has a first end located adjacent to the second end of the vibratory separator, a second end in communication with the hopper and positioned such that well cuttings placed on the first end are directed into the hopper.

In another embodiment, the current invention provides a method comprising the steps of:
(a) depositing a material containing well cuttings and well fluids on a grate having a first end and a second end;
(b) vibrating the material to separate well fluids from well cuttings such that at least a portion of the well fluids passes through the grate and well cuttings move from the first end to the second end of the grate;
(c) depositing the portion of the well fluids in a first compartment, wherein the grate is positioned above the first compartment such that the portion of the well fluids passes through the grate and into the first compartment;
(d) depositing the well cuttings from the second end of the grate into a second compartment, wherein the first compartment and second compartment are isolated such that well fluids in the first compartment do not contact well cuttings in the second compartment;
(e) recycling the well cuttings from the second compartment back to the first end of the grate to further separate diesel from the well cuttings until no more well fluids are removed from the well cuttings to thus produce mostly dry well cuttings;
(f) mixing a neutralizing compound with the mostly dry well cuttings to neutralize any remaining diesel on the well cuttings to thus produce neutralized well cuttings; and
(g) disposing of the neutralized well cuttings.

In yet another embodiment, the current invention comprises a method of disposing of well cuttings, the method comprising:
(a) preparing a road by removing a first surface material to expose a sub-grade;
(b) depositing and spreading the well cuttings on the sub-grade to produce a cuttings layer; and
(c) depositing a second surface material onto the cuttings layer such that a resurfaced road is produced.

BRIEF DESCRIPTION OF THE DRAWINGS

FIG. 2 is a top elevation view of the inventive diesel recovery system without the slide.

FIG. 3 is a front elevation view of the inventive diesel recovery system without the slide.

FIG. 4 is a rear elevation view of the inventive diesel recovery system without the slide and illustrating the electrical control system and pump system.

FIG. 6 is an elevation view of a slide elevation device useful in the invention.

DETAILED DESCRIPTION

Figure 1:
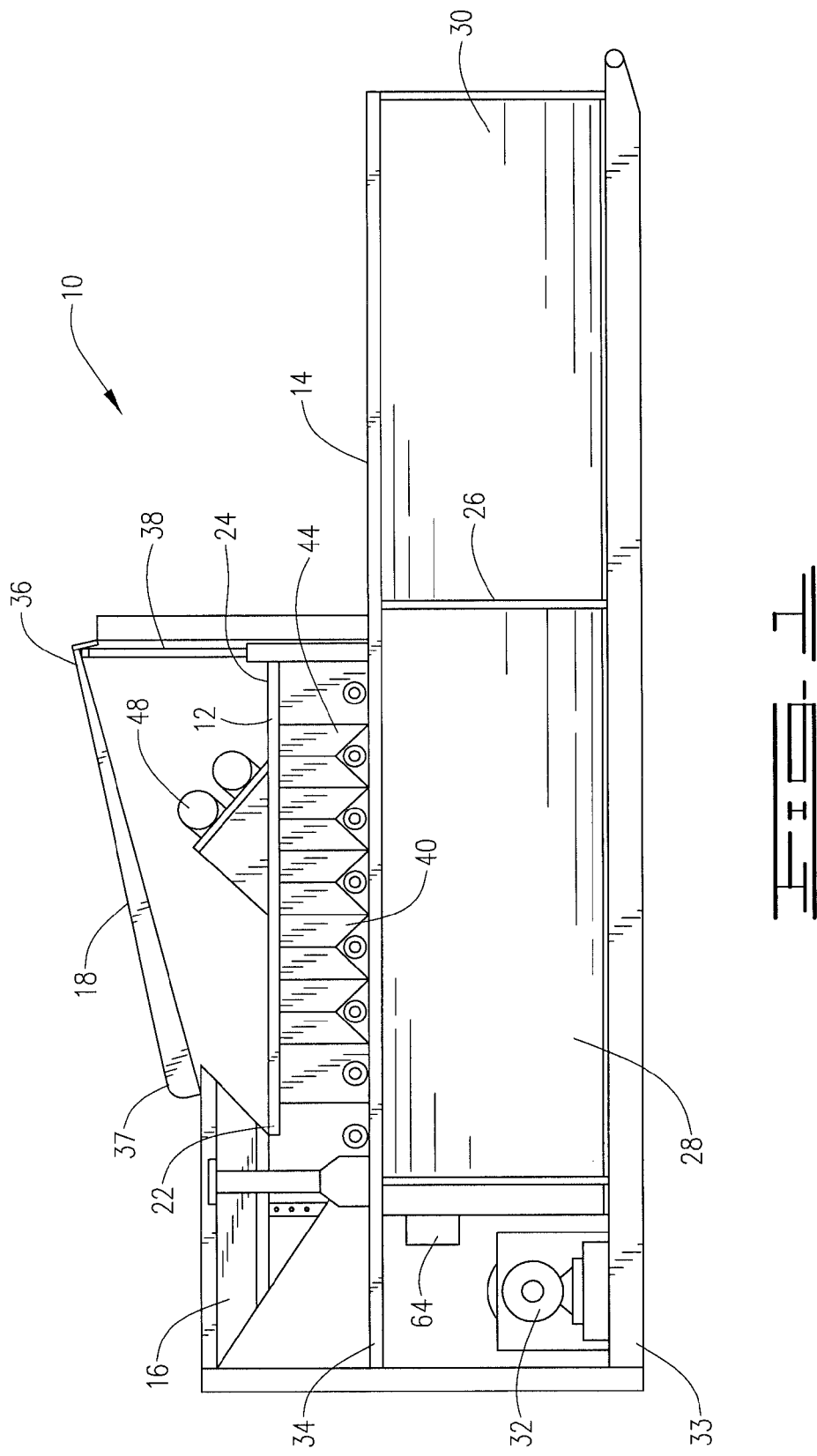
FIG. 1 is a side elevation view of the inventive diesel recovery system with the slide.
Figure 5:
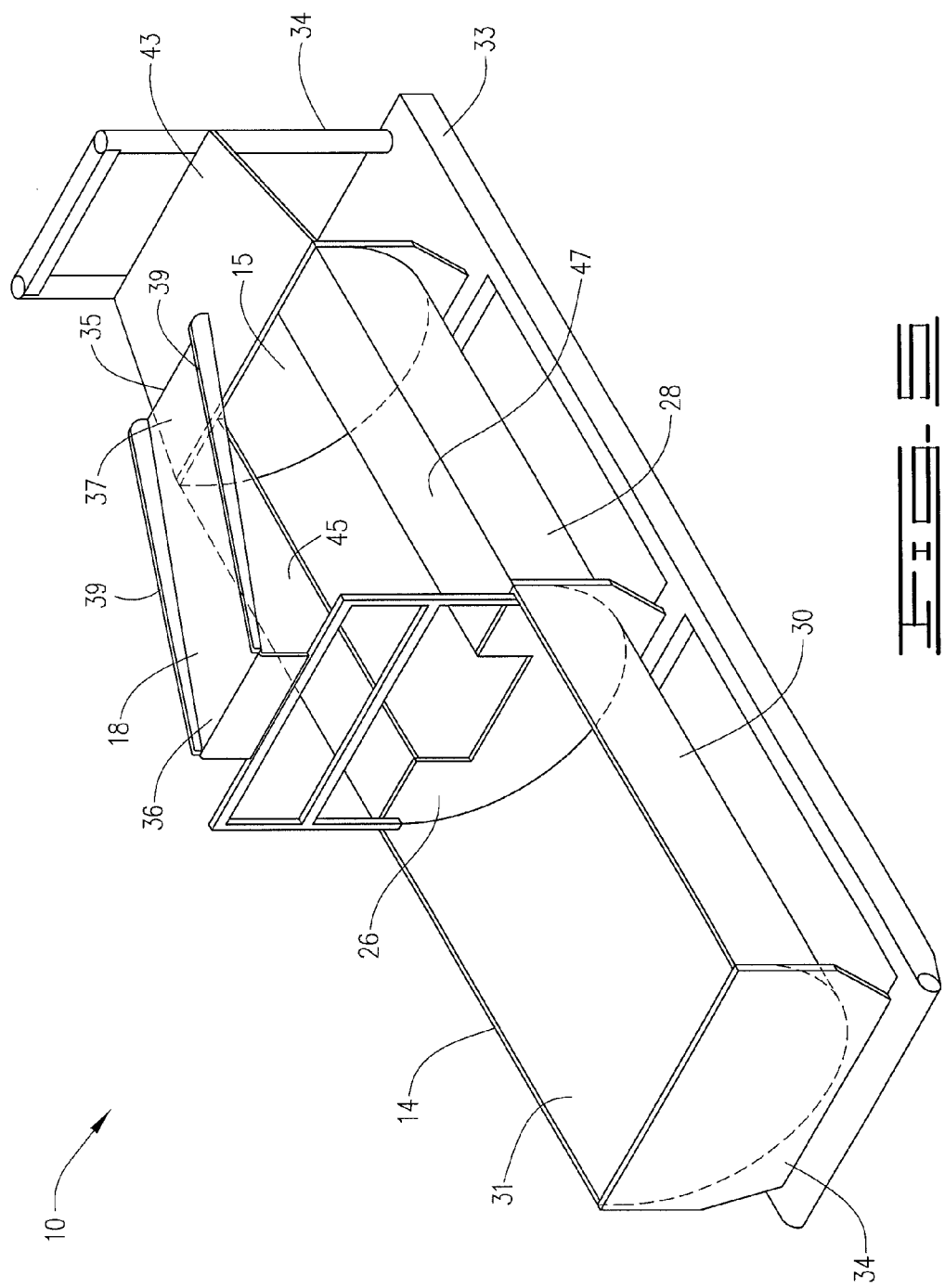
FIG. 5 is a perspective view of the diesel recovery system with the slide but without the vibratory separator being shown.

As used herein, the term "well fluids" will refer to the non-well cuttings part of the drilling mud returned from downhole in a well and will generally be hydrocarbons or diesel and other chemicals.

Referring to FIGS. 1-5, the inventive separation system is illustrated and generally designated by the numeral 10. As shown by the drawings, separation system 10 includes a vibratory separator 12. Vibratory separator 12 is illustrated as a shale shaker type vibratory separator. The vibratory separator has a first end 22 and a second end 24. The general form of the vibratory separator 12 comprises a rigid supporting framework within which is one or more mesh screens or grates 20, which extend from the first end 22 to the second end 24 of vibratory separator 12. The grate 20 can be contained in basket or box 40 having end wall 42 and sidewalls 44 and 46, which help to contain a material containing well cuttings and well fluids on the grate 20 such that it does not exit off at the first end 22 or the sides of grate 20. The end of the box located at the second end 24 can be open to allow mixture reaching second end 24 to pass off the grate, as further described below. The vibratory separator 12 has a vibrator apparatus 48, which serves to vibrate or shake grate 20. The grate 20 has holes sufficient to allow the well fluids portion of the material to pass through the grate 20 while retaining the majority of well cuttings on the grate 20. The vibration caused by vibrator apparatus 48 acts in cooperation with the grate to separate well fluids from well cuttings. Although numerous vibratory separators or shell shakers are available on the market, one shell shaker that is known to work in the invention is Derrick Equipment's FLC 503 and 504 component shaker system.

Positioned on shaker 12 is hopper 16. Material for separation, containing well cuttings and well fluid, is introduced into hopper 16. The hopper 16 is in communication with the first end 22 of vibratory separator 12. Hopper 16 and vibratory separator 12 are positioned such that material from hopper 16 is received in vibratory separator 12 and is deposited on the portion of grate 20 located adjacent to first end 22. Hopper 16 can have a flow control system 17 limiting the flow-through of material, such that quantities of material entering vibratory separator 12 are limited to a desired volume and flow rate. Flow control system 17 can comprise a combination of panels 17b that create a slit 17a that is adjustable in size to change the flow rate of material passed to vibratory separator 12.

Vibratory separator 12 sits on tank 14, also known as a half-pit. Vibratory separator 12 sits in opening 15 of half-pit 14 so as to be supported by half-pit 14. As illustrated, end wall 42 and sidewalls 44 and 46 of basket 40 rest at least partially on platforms 43, 45 and 47, respectively. The half-pit 14 is divided into at least two compartments or receptacles by divider 26. The first compartment or fluids receptacle 28 is located beneath the vibratory separator such that well fluids passing through the grate are deposited in the fluids receptacle. The second compartment or cuttings receptacle 30 is located adjacent to the second end 24 of the vibratory separator 12 such that the well cuttings are deposited into the cuttings receptacle 30 from the second end 24 of vibratory separator 12. Divider 26 fluidly seals the two compartments from each other such that the well fluid and well cuttings are not in contact with each other. As shown in the figures, first compartment 28 and second compartment 30 are separated by divider 26, which is welded in place. Second compartment 30 has opening 31 such that the top of second compartment 30 is open to allow access to the well cuttings for removal from second compartment 30.

Electrical control system 64 and pump system 32 are located near first compartment 28. The electrical control system 64 turns on and off and provides power to vibrator apparatus 48 and to the pump system. The electrical control system 64 can include an emergency shut-off mechanism for the entire system; including the pump system 32 and vibrator apparatus 48. The pump system 32 removes well fluids from first compartment 28. A hose or other tubing (not shown) can be attached to the pump system 32 and can be attached to a tank truck or tank storage (not shown) so that fluids from first compartment 28 can be introduced by the pump system into the tank truck or tank storage. Half-pit 14 is mounted upon skid 33. A support structure is built up from skid 33 and has sufficient strength to support shaker 12.

Shaker 12 is positioned on half-pit 14 over first compartment 28. First compartment 28 is positioned below grate 20, and is capable of receiving diesel falling therethrough. Second compartment 30 is positioned adjacent and below second end 24 of shaker 12 and is capable of receiving well cuttings as they exit shaker 12.

Slide 18 is shown in the FIGS. 1 and 6. Slide 18 has a receiving end 36 and a supply end 37. Receiving end 36 is positioned approximately above both divider 26 of tank 14 and second end 24 of shaker 12. Slide supply end 37 is shown positioned above hopper 16. Slide 18 has a generally downward slope from receiving end 36 to supply end 37. Well cuttings from cuttings receptacle 30 of tank 14 are deposited onto receiving end 36 of slide 18. The well cuttings may be deposited manually, by use of a mechanical shovel, such as various excavators that are known in the art, or by a conveying means, such as a vertical conveying belt. Well cuttings deposited on slide 18 move from receiving end 36 to supply end 37 and then are deposited in hopper 16. Generally, the well cuttings will move downwardly towards supply end 37 under the influence of gravitational forces but such movement can be assisted by vibrations from vibratory apparatus 48 or by other appropriate means such as a conveyer belt affixed over the surface of slide 18. When used, slide receiving end 36 may be positioned in any operational location that facilitates the movement of well cuttings from the second end 24 towards hopper 16. Slide 18 can have sidewalls 39 to help retain the well cuttings on the slide and prevent them from falling off prior to reaching hopper 16.

As can be best seen from FIGS. 1, 3 and 4, slide elevation device 38 adjusts the height of receiving end 36 to enable the flow of well cuttings toward hopper 16. Any type of height adjusting device is contemplated. As illustrated in FIG. 6, slide elevation device 38 has U-bar 50 on which receiving end 36 of slide 18 rest. U-bar 50 is slideably mounted in guides 52 and 54, which are mounted on platforms 45 and 47, respectively. Elevation rod 56 engages U-bar 50 at its center. Elevation rod 56 is screw mounted to screw mount 58 by adjustment lug 60. Screw mount 58 is mounted on crossbar 62, which is connected to guides 52 and 54. By turning adjustment lug 60, elevation rod 56 can be raised or lowered, which in turn raises or lowers U-bar 50 and, hence, receiving end 36 of slide 18. Thus, by means of slide elevation device 38 the angle from horizontal can be increased or decreased for slide 18.

In operation, material containing well cuttings and well fluid is placed in hopper 16 to fall onto shaker 12. The material vibrates across grate 20 of shaker 12 towards second end 24. Upon grate 20, at least a portion of the well fluid is separated from the well cuttings and falls through grate 20 into first compartment 28. The well cuttings continue to vibrate across grate 20 and fall into second compartment 30. The process is repeated until no visible diesel is falling from the well cuttings.

To repeat the process, the well cuttings are removed from second compartment 30 and placed in hopper 16 for recycling. As shown with slide 18, the recycling involves removing the well cuttings and depositing them on slide 18 at receiving end 36. The well cuttings move by combination of gravity and, optionally, vibration towards supply end 37. At supply end 37, the well cuttings continue moving off edge 35 and falling into hopper 16. From hopper 16 the well cuttings are deposited on grate 20 and once again subjected to vibration such that at least a portion of the remaining well fluid associated with the well cuttings is separated off as described above. The well cuttings are subjected to repeated vibratory separations in accordance with the above description until the process has resulted in mostly dry well cuttings; i.e., until substantially no well fluid is separated from the well cuttings by the vibratory separation. Optionally, a visual inspection can be made to determine how wet the cuttings appear. If a visual inspection is made, then after the inspector believes the cuttings are mostly dry, the process moves on to the next phase. At this point, the mostly clean well cuttings are positioned in second compartment 30 of tank 14.

The mostly clean well cuttings are mixed with a neutralizing agent such as cement kiln dust (CKD) in order to neutralize them. Once the well cuttings are neutralized, they are ready for storage and/or disposal.

As described above, disposal of the well cuttings has been a problem. Part of the present invention is to dispose of the neutralized well cuttings as part of a road. Generally, the roads will be country roads that are commonly dirt or gravel. In this approach, a mechanical means is used to rip the roadbed up to remove the surface material. The surface material can be pushed to the side of the road or hauled off for disposal or use elsewhere. There are several pieces of road machinery capable of providing this function. By way of a non-limiting example, a bulldozer or road grader both have teeth for ripping and a blade for moving the ripped surface material to the side of the road.

Once the road is ripped and the surface material moved, the neutralized well cuttings, in accordance with the above-described process, are applied to the exposed ground or sub-grade. The cuttings can be spread and compacted to serve as the foundation or road base. Optionally gravel, crushed rock or other road base material can be added as a first layer prior to the application of the cuttings or as a layer over the cuttings. After the neutralized cuttings are added and compacted and other base layers added, if desired, a surface material is applied to the foundation and compacted as necessary. The surface material can be the previously removed surface material or may be a fresh surface material comprising dirt, gravel or an asphalt based road material.

In one embodiment, the process of disposing of the neutralized well cuttings comprises ripping up the surface of a dirt road with a bulldozer having ripper teeth. The ripped-up material is deposited at the side of the road. The neutralized well cuttings are applied to the exposed ground or sub-grade. After the neutralized well cuttings are applied, the material that was ripped up and moved to the side is applied onto the top of the cuttings. Subsequently, a layer of gravel or small rock can be applied. This layer of gravel or small rock can be from 3-inches to 4-inches thick.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. An apparatus for separating a material containing well cuttings and well fluids, the apparatus comprising:
    a hopper for receiving said material;
    a vibratory separator having a first end, a second end, a grate extending from said first end to said second end and a vibrator apparatus connected to said grate to vibrate said grate; wherein said hopper is in communication with said first end so that material is directed from said hopper to said grate at said first end and wherein said material is vibrated on said grate such that at least a portion of said well fluids is separated from said well cutting so that said portion of said well fluids passes through said grate and so that said well cuttings remain on said grate and move to said second end;
    a fluids receptacle located beneath said vibratory separator such that well fluids passing through said grate are deposited in said fluids receptacle;
    a cuttings receptacle located adjacent to said second end of said vibratory separator such that said well cuttings are deposited into said cuttings receptacle; and
    a slide having a first end located adjacent to said second end of said vibratory separator, a second end in communication with said hopper and positioned such that well cuttings placed on said first end are directed into said hopper.

2. The apparatus of claim 1, further comprising a tank wherein said fluids receptacle and said cuttings receptacle are compartments of said tank and said compartments are separated such that well fluids in said fluids receptacle and well cuttings in said cuttings receptacle tank are not in contact.

3. The apparatus of claim 2, wherein said vibratory apparatus is located on top of said tank and is connected thereto.

4. The apparatus of claim 1, wherein said slide is vibrated by said vibrating apparatus such that said well cuttings are moved from said first end of said slide to said second end of said slide by said vibrations.

5. The apparatus of claim 1, wherein said slide has sidewalls extending upwards so as to retain said well cutting on said slide and prevent said well cuttings from falling off prior to reaching said hopper.

6. The apparatus of claim 1, further comprising an elevation device connected to said slide such that the angle from horizontal for said slide can be adjusted.

7. The apparatus of claim 6, wherein said slide elevation device comprises:
    a U-bar on which the first end of said slide rest; and
    a screw mount which engages said U-bar such that turning said screw mount adjust the height of said U-bar thus changing the height of said first end of said slide.

8. The apparatus of claim 7, wherein said slide elevation device further comprises:
    a first guide which slidingly engages a first leg of said U-bar;
    a second guide which slidingly engages a second leg of said U-bar; and
    an elevation rod which engages said U-bar and said screw mount such that turning said screw mount adjust the height of said elevation rod thus changing the height of said U-bar.

9. The apparatus of claim 8, wherein said slide elevation device further comprises a crossbar connected at a first end to said first guide and at a second end to said second guide, wherein said screw mount is mounted on said crossbar.

\* \* \* \* \*